US012646707B2

(12) United States Patent　　　　(10) Patent No.: US 12,646,707 B2

He et al.　　　　　　　　　　　　　　(45) Date of Patent:　　Jun. 2, 2026

(54) SILICON-CARBON COMPOSITE ANODE MATERIAL AND PREPARATION METHOD THEREOF, AND LITHIUM ION BATTERY

(71) Applicant: BTR NEW MATERIAL GROUP CO., LTD., Shenzhen (CN)

(72) Inventors: Peng He, Shenzhen (CN); Chengmao Xiao, Shenzhen (CN); Eming Guo, Shenzhen (CN); Jianguo Ren, Shenzhen (CN); Xueqin He, Shenzhen (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 576 days.

(21) Appl. No.: 18/247,929

(22) PCT Filed: Oct. 13, 2021

(86) PCT No.: PCT/CN2021/123543
§ 371 (c)(1),
(2) Date: Apr. 5, 2023

(87) PCT Pub. No.: WO2022/174598
PCT Pub. Date: Aug. 25, 2022

(65) Prior Publication Data
US 2023/0378444 A1　　Nov. 23, 2023

(30) Foreign Application Priority Data

Feb. 20, 2021　(CN) ......................... 202110193665.9

(51) Int. Cl.
H01M 4/36　　　　(2006.01)
H01M 4/02　　　　(2006.01)
(Continued)

(52) U.S. Cl.
CPC ........... *H01M 4/366* (2013.01); *H01M 4/386* (2013.01); *H01M 4/583* (2013.01);
(Continued)

(58) Field of Classification Search
CPC ...... H01M 4/366; H01M 4/386; H01M 4/583; H01M 10/0525; H01M 4/0471;
(Continued)

(56) References Cited

U.S. PATENT DOCUMENTS

2009/0311606 A1* 12/2009 Fukuoka ........... H01M 10/0525
　　　　　　　　　　　　　　　　　　　427/78
2013/0122369 A1　5/2013 Kim et al.
(Continued)

FOREIGN PATENT DOCUMENTS

CN　　　101609879 A　　12/2009
CN　　　102110853 A　　6/2011
(Continued)

OTHER PUBLICATIONS

Notification to Grant Patent Right for Invention for Application No. 202110193665.9 issued by The State Intellectual Property Office of People's Republic of China on Oct. 19, 2022.
(Continued)

*Primary Examiner* — Stewart A Fraser
(74) *Attorney, Agent, or Firm* — Carlson, Gaskey & Olds, P.C.

(57) ABSTRACT

The present application relates to a field of anode material, and a silicon carbon composite anode material and preparation method thereof, and a lithium ion battery provided. The silicon carbon composite anode material includes a silicon-based active particle, a conductive material, and a carbon coating layer, where the carbon coating layer is present on surface of the silicon-based active particle and/or the conductive material; and a semi-width of an X-ray
(Continued)

diffraction angle (2θ) of the silicon-based active particle on a crystal face (111) is greater than or equal to 0.5 degree when X-ray diffraction of the silicon-based active particle is tested with CuKα ray. The silicon carbon composite anode material and preparation method thereof, and a lithium ion battery can effectively inhibit volume expansion of anode material and improve cycle performance of battery.

8 Claims, 2 Drawing Sheets

(51) Int. Cl.
    *H01M 4/38*         (2006.01)
    *H01M 4/583*       (2010.01)
    *H01M 10/0525*    (2010.01)

(52) U.S. Cl.
    CPC .. *H01M 10/0525* (2013.01); *H01M 2004/021*
             (2013.01); *H01M 2004/027* (2013.01)

(58) Field of Classification Search
    CPC .... H01M 4/133; H01M 4/134; H01M 4/1395;
                H01M 4/625; H01M 4/364
    See application file for complete search history.

(56) References Cited

U.S. PATENT DOCUMENTS

| | | | | |
|---|---|---|---|---|
| 2013/0273439 A1* | 10/2013 | Tanaka | .................. | H01M 4/483 |
| | | | | 429/231 |
| 2020/0280060 A1* | 9/2020 | Kim | ...................... | H01M 4/386 |
| 2021/0028447 A1* | 1/2021 | Takahashi | ............. | H01M 4/366 |

FOREIGN PATENT DOCUMENTS

| | | |
|---|---|---|
| CN | 102792493 A | 11/2012 |
| CN | 103647056 A | 3/2014 |
| CN | 104577066 A | 4/2015 |
| CN | 105576185 A | 5/2016 |
| CN | 106299277 A | 1/2017 |
| CN | 108352521 A | 7/2018 |
| CN | 109524626 A | 3/2019 |
| CN | 109671942 A | 4/2019 |
| CN | 110504430 A | 11/2019 |
| CN | 110718685 | 1/2020 |
| CN | 111342027 A | 6/2020 |
| CN | 111628160 A | 9/2020 |
| CN | 111755680 A | 10/2020 |
| CN | 111755683 A | 10/2020 |
| JP | 2009301935 | 12/2009 |
| JP | 2015037057 | 2/2015 |
| JP | 2015038894 A | 2/2015 |
| JP | 2015115137 | 6/2015 |
| JP | 2015210962 | 11/2015 |
| JP | 2017098005 | 6/2017 |
| JP | 2017191707 A | 10/2017 |
| JP | 2018181710 | 11/2018 |
| WO | 2012036127 | 3/2012 |

OTHER PUBLICATIONS

First Office Action for Application No. 202110193665.9 issued by The State Intellectual Property Office of People's Republic of China on Apr. 13, 2022.

Second Office Action Application No. 202110193665.9 issued by The State Intellectual Property Office of People's Republic of China on Jul. 20, 2022.

International Search Report for International application No. PCT/CN2021/123543 dated Jan. 14, 2022.

Extended European Search Report for European Patent Application No. 21926312.6 dated Dec. 12, 2024.

Office action for Japanese Patent Application No. 2023-516632 dated May 7, 2024.

Electric Vehicle Engineering Manual, Yu Duan, vol. 4, Power Fan Battery/Zhi Chengwei (Ed.), A North Chapter: China Machine Press, Nov. 2019; ISBN 97-7-iii-6408-9 (16 pages).

\* cited by examiner

SILICON-CARBON COMPOSITE ANODE MATERIAL AND PREPARATION METHOD THEREOF, AND LITHIUM ION BATTERY

CROSS-REFERENCE TO RELATED APPLICATION

The present application is a National Stage of International Application No. PCT/CN2021/123543 filed Oct. 13, 2021, which claims the benefit of priority of Chinese Patent Application No. 202110193665.9 filed with China Patent Office on Feb. 20, 2021, entitled with "SILICON CARBON COMPOSITE ANODE MATERIAL AND PREPARATION METHOD THEREOF, AND LITHIUM ION BATTERY", the content of which are hereby incorporated by reference in their entirety.

TECHNICAL FIELD

The present application relates to a technical field of anode material and, in particular, to a silicon carbon composite anode material, a preparation method thereof, and a lithium ion battery.

BACKGROUND

Lithium ion battery is widely used in electric vehicles and consumer electronics due to advantages of large energy density, high output power, long cycle life, and less environmental pollution. In order to increase the energy density of battery, the research and development on silicon anode materials are advancing day after day. However, the silicon anode material has a large volume expansion rate (>300%) in the process of lithium intercalation and de-intercalation, and the silicon anode material may pulverize to fell off from a current collector during charging and discharging process, so that electrical contact between the active material and the current collector is lost, resulting poor electrochemical property, reduced capacity, and decreased cycle stability. Therefore, it is difficult to be applied commercially. In order to improve conductivity and cycle stability of the silicon anode material, nano-structuring, porousization, or carbon-coating have been applied. Among them, modification on the silicon material itself is one of important directions.

Based on this, there is a pressing need on develop a silicon carbon composite anode material to inhibit the volume expansion of anode material and improve the cycle stability of the material.

SUMMARY

In view of this, the present application provides a silicon carbon composite anode material and a preparation method thereof, and a lithium ion battery, which can effectively inhibit volume expansion of anode material and improve cycle performance of battery. The preparation method can reduce preparation cost.

In a first aspect, the present application provides a silicon carbon composite anode material. The silicon carbon composite anode material includes a silicon-based active particle, a conductive material, and a carbon coating layer, where the carbon coating layer is present on surface of the silicon-based active particle and/or the conductive material; and a semi-width of an X-ray diffraction angle (2θ) of the silicon-based active particle on a crystal face (111) is greater than or equal to 0.5 degree when X-ray diffraction of the silicon-based active particle is tested with CuKα ray.

In the above solution, by controlling the performance parameters of the silicon-based active particle itself, a semi-width of an X-ray diffraction angle (2θ) of the silicon-based active particle on a crystal face (111) is greater than or equal to 0.5 degree, which facilitate to inhibit volume expansion of silicon, reduce expansion rate of the anode, improve charging and discharging efficiency of the anode, and increase cycle performance of battery.

In a second aspect, the present application further provides a silicon carbon composite anode material. The silicon carbon composite anode material has a core-shell structure, and includes a silicon-based active particle and a carbon coating layer coated on at least part of surface of the silicon-based active particle; and a semi-width of an X-ray diffraction angle (2θ) of the silicon carbon composite anode material on a crystal face (111) is greater than or equal to 0.5 degree when X-ray diffraction of the silicon carbon composite anode material is tested with CuKα ray.

In a feasible embodiment, the silicon carbon composite anode material has a core-shell structure. The core includes the silicon-based active particle and the conductive material embedded among the silicon-based active particles. The shell includes the carbon coating layer.

In a feasible embodiment, the silicon carbon composite anode material satisfies at least one of following conditions a to f:

a. the silicon-based active particle includes at least one of Si, $SiO_x$ and silicon alloy, where $0<x\leq2$;

b. a median particle size of the silicon-based active particles is 5 nm to 120 nm;

c. a hardness of the silicon-based active particle tested by a nanoindentation is 3 GPa to 20 GPa;

d. a mass content of $Si^{4+}$ in the silicon-based active particle is 0.05% to 5%;

e. the conductive material includes at least one of graphite flake, carbon nanotube, carbon fiber, and graphene; and f. a thickness of the carbon coating layer is 50 nm to 2500 nm.

In a feasible embodiment, the silicon carbon composite anode material satisfies at least one of following conditions a to f:

a. a median particle size of the silicon carbon composite anode material is 5 μm to 30 μm;

b. a specific surface area of the silicon carbon composite anode material is 0.5 $m^2$/g to 10 $m^2$/g;

c. a powder compaction density of the silicon carbon composite anode material is 0.4 $g/cm^3$ to 1.2 $g/cm^3$;

d. a mass content of carbon element in the silicon carbon composite anode material is 15% to 65%;

e. a mass content of the silicon-based active particle in the silicon carbon composite anode material is 15% to 70%; and f. a mass content of the conductive material in the silicon carbon composite anode material is 5% to 70%.

In a third aspect, the present application provides a preparation method of a silicon carbon composite anode material. The method includes following steps:

adding a silicon-based active particle into an organic solvent and dispersing to obtain a precursor solution, where a semi-width of an X-ray diffraction angle (2θ) of the silicon-based active particle on a crystal face (111) is greater than or equal to 0.5 degree when X-ray diffraction of the silicon-based active particle is tested with CuKα ray;

adding a conductive material and a carbon source precursor to the precursor solution to obtain an anode material precursor; and heat-treating the anode material precursor to obtain a silicon carbon composite anode material, where the silicon carbon composite anode material includes a silicon-based active particle, a conductive material, and a carbon coating layer, and the carbon coating layer is formed on surface of the silicon-based active particle and/or the conductive material.

In the above solution, by controlling the performance parameters of the silicon-based active particle itself, a semi-width of an X-ray diffraction angle (2θ) of the silicon-based active particle on a crystal face (111) is greater than or equal to 0.5 degree. In the preparation, the silicon-based active particle, the conductive material, and the carbon source precursor are mixed in a solvent, and then heat-treated to obtain the anode material. The anode material prepared facilitate to inhibit volume expansion of silicon, reduce expansion rate of the anode, improve charging and discharging efficiency of the anode, and increase cycle performance of battery.

In a fourth aspect, the present application provides a preparation method of a silicon carbon composite anode material. The method includes following steps:

adding a silicon-based active particle into an organic solvent and dispersing to obtain a precursor solution, where a semi-width of an X-ray diffraction angle (2θ) of the silicon-based active particle on a crystal face (111) is greater than or equal to 0.5 degree when X-ray diffraction of the silicon-based active particle is tested with CuKα ray;

adding a carbon source precursor to the precursor solution to obtain an anode material precursor; and heat-treating the anode material precursor to obtain a silicon carbon composite anode material, where the silicon carbon composite anode material includes a silicon-based active particle and a carbon coating layer, and the carbon coating layer is formed on at least part of surface of the silicon-based active particle.

In the above solution, by controlling the performance parameters of the silicon-based active particle itself, a semi-width of an X-ray diffraction angle (2θ) of the silicon-based active particle on a crystal face (111) is greater than or equal to 0.5 degree. In the preparation, the silicon-based active particle and the carbon source precursor are mixed in a solvent, and then heat-treated to obtain the anode material. The anode material prepared facilitate to inhibit volume expansion of silicon, reduce expansion rate of the anode, improve charging and discharging efficiency of the anode, and increase cycle performance of battery.

In a feasible embodiment, the silicon carbon composite anode material satisfies at least one of following conditions a to d:

a. a mass content of $Si^{4+}$ in the silicon-based active particle is 0.05% to 5%;

b. a median particle size of the silicon-based active particles is 5 nm to 120 nm;

c. a hardness of the silicon-based active particle tested by a nanoindentation is 3 GPa to 20 GPa; and d. the silicon-based active particle includes at least one of Si, $SiO_x$ and silicon alloy, where $0<x≤2$.

In a feasible embodiment, the silicon carbon composite anode material satisfies at least one of following conditions a to e:

a. a median particle size of the silicon carbon composite anode material is 5 μm to 30 μm;

b. a specific surface area of the silicon carbon composite anode material is 0.5 $m^2$/g to 10 $m^2$/g;

c. a powder compacted density of the silicon carbon composite anode material is 0.4 $g/cm^3$ to 1.2 $g/cm^3$;

d. a mass content of carbon element in the silicon carbon composite anode material is 15% to 65%; and e. a mass content of the silicon-based active particle in the silicon carbon composite anode material is 15% to 70%.

In a feasible embodiment, a mass content of the conductive material in the silicon carbon composite anode material is 5% to 70%.

In a feasible embodiment, the method satisfies at least one of following conditions a to c:

a. a mass ratio of the silicon-based active particle, the conductive material, and the carbon source precursor is (10-70):(5-30):(15-40);

b. the conductive material includes at least one of graphite flake, carbon nanotube, carbon fiber, and graphene; and c. the carbon source precursor includes at least one of sucrose, glucose, polyethylene, polyaniline, phenolic resin, polyvinyl chloride, and asphalt.

In a feasible embodiment, the method satisfies at least one of following conditions a to b:

a. a mass ratio of the silicon-based active particle and the carbon source precursor is (10-70):(15-40); and b. the carbon source precursor includes at least one of sucrose, glucose, polyethylene, polyaniline, phenolic resin, polyvinyl chloride, and asphalt.

In a feasible embodiment, after dispersing the silicon-based active particle in the organic solvent, the method further includes:

adding a surfactant into the organic solvent, where the surfactant includes at least one of polyvinyl alcohol, n-octadecanoic acid, polyethylene glycol, lauric acid, polyacrylic acid, sodium dodecylbenzene sulfonate, n-eicosanoic acid, polyvinyl chloride, and polyvinylpyrrolidone; and/or, the organic solvent includes at least one of methanol, ethanol, ethylene glycol, propanol, isopropanol, propanetriol, n-butanol, isobutanol, and pentanol.

In a feasible embodiment, the method satisfies at least one of following conditions a to c:

a. a temperature of the heat treatment is 500° C. to 1200° C.;

b. a time of the heat treatment is 1 h to 9 h; and c. a heating rate of the heat treatment is 1° C./min to 15° C./min.

In a fifth aspect, the present application provides a lithium ion battery. The lithium ion battery includes the silicon carbon composite anode material or the anode material prepared by the above preparation method of the silicon carbon composite anode material.

The technical solution of the present application has at least following beneficial effects:

In the silicon carbon composite anode materials provided by the present application, a semi-width of an X-ray diffraction angle (2θ) of the silicon-based active particle on a crystal face (111) is greater than or equal to 0.5 degree. The silicon-based active particle has a smaller grain size, which can effectively reduce volume expansion rate of silicon and improve cycle performance. Other beneficial effects will be explained in the description of embodiments.

DESCRIPTION OF EMBODIMENTS

Figure 1:
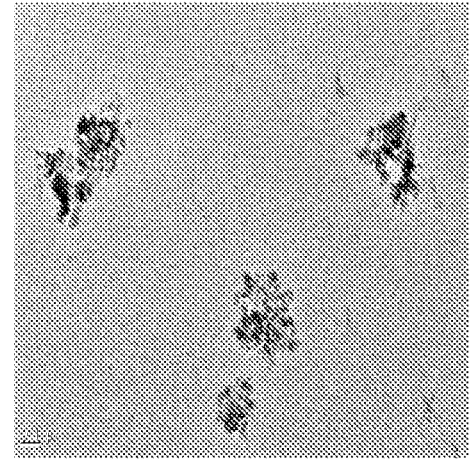
FIG. 1 is a SEM photograph of the silicon carbon composite anode material provided by an embodiment of the present application.

Preferred embodiments of the present application will be described below. It should be noted that for an ordinary person skilled in the art, some improvements and modifications can be made without departing from the principle of the present application, which are deemed to be in the protection scope of the present application.

The existing lithium ion battery is widely used in electric vehicles and consumer electronics due to advantages of large energy density, high output power, long cycle life, and less environmental pollution. In order to increase the energy density of battery, the research and development on silicon anode materials are advancing day after day. However, the silicon anode material has a large volume expansion rate (>300%) in the process of lithium intercalation and de-intercalation, and the silicon anode material may pulverize to fell off from a current collector during charging and discharging process, so that electrical contact between the active material and the current collector is lost, resulting poor electrochemical property, reduced capacity, and decreased cycle stability. Therefore, it is difficult to be applied commercially. In order to improve conductivity and cycle stability of the silicon anode material, the silicon material itself can be modified to improve conductivity and cycle stability of silicon anode material.

In a first aspect, following the direction of modification on the silicon material itself, the present application provides a silicon carbon composite anode material. The silicon carbon composite anode material includes a silicon-based active particle, a conductive material, and a carbon coating layer.

In some embodiments, the carbon coating layer is present on surface of the silicon-based active particle.

In some embodiments, the carbon coating layer is present on surface of the conductive material.

In some embodiments, the carbon coating layer is present on surfaces of both the silicon-based active particle and the conductive material.

When X-ray diffraction of the silicon-based active particle is tested with CuKα ray, a semi-width of an X-ray diffraction angle (2θ) of the silicon-based active particle on a crystal face (111) is greater than or equal to 0.5 degree.

It is understood that when X-ray irradiates to a small crystal, the diffraction lines thereof will be diffused and thus widened. The smaller the grain size of the crystal, the greater the degree of widening of the X-ray diffraction band. Therefore, the silicon-based active particle in the anode material of the present application is a silicon-based active particle with smaller grain size, which can effectively reduce volume expansion rate of silicon and improve cycle performance. When the semi-width of the X-ray diffraction angle (2θ) of the silicon-based active particle on the crystal face (111) is lower than 0.5, the grain size of the silicon-based active particle is excessively large, and volume expansion rate of the silicon active particle is larger, which does not facilitate to improve performances of the anode material. Preferably, the semi-width of the X-ray diffraction angle (2θ) of the silicon-based active particle on the crystal face (111) is greater than or equal to 0.6 degree.

In a second aspect, the present application further provides a silicon carbon composite anode material. The silicon carbon composite anode material has a core-shell structure, and includes a silicon-based active particle and a carbon coating layer coated on at least part of surface of the silicon-based active particle.

When X-ray diffraction of the silicon carbon composite anode material is tested with CuKα ray, a semi-width of an X-ray diffraction angle (2θ) of the silicon carbon composite anode material on a crystal face (111) is greater than or equal to 0.5 degree.

In some embodiments, the silicon-based active particle includes at least one of Si, $SiO_x$ and silicon alloy, where $0<x\leq2$, but is not limited to the listed above, and other conventional silicon-based active material in the art, e.g., carbon-coating silicon oxide, silicon-doping semiconductor, or other silicon-containing compound, is also applicable. For example, the silicon-based active particle can be Si, SiO, $SiO_2$, silicon lithium alloy, silicone magnesium alloy, etc. In some preferred embodiments, there is a $SiO_x$ silicon oxide on surface of the silicon-based active particle, which can effectively inhibit volume expansion of silicon, and improve efficiency and cycle life of the anode including the anode active material.

In some embodiments, a mass content of $Si^{4+}$ in the silicon-based active particle is 0.05% to 5%. Specifically, it can be 0.05%, 0.1%, 0.2%, 0.3%, 0.4%, 0.5%, 1%, 1.5%, 2%, 2.5%, 3%, 3.5%, 4%, 4.5%, 5%, etc. It should be noted that due to the presence of $Si^{4+}$ in the silicon-based active particle, it can be a second non-active phase in the process of lithium intercalation and de-intercalation of silicon. When the second non-active phase containing $Si^{4+}$ uniformly disperses in the silicon-based active particle in a diffused fine particle form, it will bring a significant reinforcement. The second non-active phase plays a role of stabilizing structure during volume expansion of silicon, which can effectively inhibit volume expansion of silicon, reduce expansion rate, and improve cycle stability of battery. It is found in the research that when the mass content of $Si^{4+}$ in the silicon-based active particle exceeds 5%, capacity and initial coulombic efficiency of the anode material is reduced.

Figure 2:
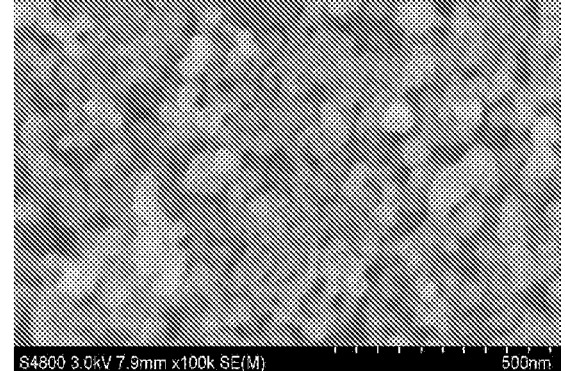
FIG. 2 is another SEM photograph of the silicon carbon composite anode material provided by an embodiment of the present application.

In some embodiments, as shown in FIG. 1 and FIG. 2, a median particle size of the silicon-based active particles is 5 nm to 120 nm. Specifically, it can be 5 nm, 10 nm, 20 nm, 25 nm, 30 nm, 35 nm, 40 nm, 50 nm, 60 nm, 70 nm, 80 nm, 90 nm, 100 nm, 110 nm or 120 nm, etc., but is not limited to the above. Preferably, the median particle size of the silicon-based active particles is 5 nm to 80 nm. It is understood that the smaller the particle size of the silicon-based active particle, the better the performance of the material. Comprehensively considering process costs of the silicon-based active particle with smaller particle size, the median particle size of the silicon-based active particles is more preferably 5 nm to 40 nm.

Figure 3:
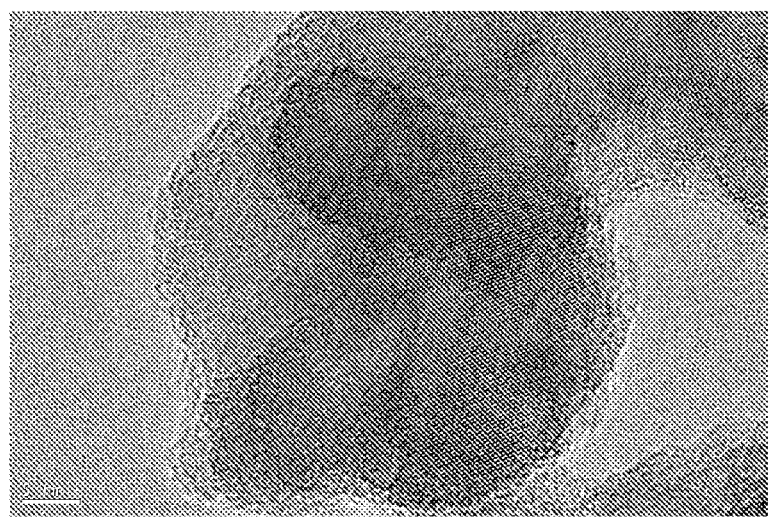
FIG. 3 is a TEM high-resolution photograph of the silicon-based active particle in the silicon carbon composite anode material provided by an embodiment of the present application.

It can be found through numerous examinations that nanoscale silicon-based active particle has a high surface energy, and has randomly arranged atoms on its surface, thereby having good extensibility and stability. Moreover, the particle has strong structure, so that the volume expansion of silicon can be inhibited. However, since the nanoscale silicon-based active particle has a high surface energy, they tend to be agglomerated during charging and discharging process. Therefore, in the composite anode material provided by the present application, there is a conductive material among the silicon-based active particles, and the silicon-based active particle and the conductive material are coated by the carbon coating layer, which can inhibit the occurrence of agglomeration and reduce direct contact between the silicon-based active particle and electrolyte. The silicon-based active particle has a large specific surface area, thus tend to generate passivation film on the surface during charging and discharging process, which consumes a large amount of lithium ions and reduces concentration of lithium ions in electrolyte, lowering reversible capacity of battery. Therefore, by coating the carbon coating layer, it is able to reduce the direct contact between the silicon-based active particle and electrolyte, reduce the generation of passivation film, and improve the reversible capacity of battery. As shown in FIG. 3, the silicon-based active particle can be a single-crystalline silicon nanoparticle consisting of only one grain, and/or, a polycrystalline silicon nanoparticle consisting of multiple grains.

In some embodiments, a nanoindentation is applied, a hardness of the silicon-based active particle tested by the nanoindentation is 3 GPa to 20 GPa. Specifically, it can be 3 GPa, GPa, 8 GPa, 12 GPA, 15 GPa, 18 GPa or 20 GPa, etc., but is not limited to the above. It can be found through numerous examinations that when the hardness of the silicon-based active particle is within the above range, due to having strong rigidity, the particle has a strong structure stability, which can resist a certain volume expansion stress, thereby reducing expansion and improving cycle stability of battery. When the hardness is higher than 20 GPa, chemical bond energy between surfaces of the particles is very large, a higher energy barrier for opening bonding is required for lithium intercalation and de-intercalation, resulting difficult for lithium intercalation, which does not facilitate to improve performance of the anode material.

In some embodiments, the conductive material includes at least one of graphite flake, carbon nanotube, carbon fiber, and graphene, but is not limited to the listed above, and other conventional conductive material in the art, e.g., coke, carbon black, and carbon micro-sphere, is also applicable. Specifically, the graphite flake can be natural flake graphite, and the carbon fiber can be natural carbon fiber or synthetic carbon fiber.

In some embodiments, a thickness of the carbon coating layer is 50 nm to 2500 nm. Specifically, it can be 50 nm, 100 nm, 200 nm, 300 nm, 400 nm, 500 nm, 600 nm, 700 nm, 800 nm, 1000 nm, 1200 nm, 2000 nm or 2500 nm, etc., but is not limited to the above. The carbon coating layer coated on the silicon-based active particle and the conductive material can reduce contact between the silicon-based active particle and electrolyte, reduce generation of passivation film, and improve capacity of battery. The thicker the thickness of the carbon coating layer, the better the protection effect, thereby ensuring a more stable structure. However, if the carbon coating layer is excessively thick, proportion of carbon is excessively large, resulting an excessively low capacity of the silicon carbon composite material. Preferably, the thickness of the carbon coating layer can be controlled to be 100 nm to 1500 nm.

In some embodiments, the silicon carbon composite anode material has a core-shell structure. The core includes the silicon-based active particle and the conductive material. The shell includes the carbon coating layer. The particle of the silicon carbon composite anode material can also be spherical or spherical-like in shape. The conductive material is embedded among the silicon-based active particles.

In some embodiments, a median particle size of the silicon carbon composite anode material is 5 μm to 30 μm. Specifically, it can be 5 μm, 8 μm, 10 μm, 12 μm, 15 μm, 18 μm, 20 μm, 23 μm, 25 μm, 28 μm or 30 μm, etc, but is not limited to the above. Preferably, the median particle size of the silicon carbon composite anode material is 8 μm to 20 μm.

In some embodiments, a specific surface area of the silicon carbon composite anode material is 0.5 $m^2$/g to 10 $m^2$/g. Specifically, it can be 0.5 $m^2$/g, 1 $m^2$/g, 2 $m^2$/g, 3 $m^2$/g, 4 $m^2$/g, 5 $m^2$/g, 6 $m^2$/g, 7 $m^2$/g, 8 $m^2$/g, 9 $m^2$/g, or 10 $m^2$/g, etc., but is not limited to the above. Preferably, the specific surface area of the silicon carbon composite anode material is 1 $m^2$/g to 6 $m^2$/g. It is understood that the smaller the specific surface area, the better. The excessively large specific surface area can easily lead to formation of SEI film, consuming excessive amount of irreversible lithium salt, and reducing initial coulombic efficiency of battery. Comprehensively considering costs of preparation process, the specific surface area is controlled to be 1 $m^2$/g to 6 $m^2$/g.

In some embodiments, a powder compacted density of the silicon carbon composite anode material is 0.4 $g/cm^3$ to 1.2 $g/cm^3$. Specifically, it can be 0.4 $g/cm^3$, 0.5 $g/cm^3$, 0.6 $g/cm^3$, 0.7 $g/cm^3$, 0.8 $g/cm^3$, 0.9 $g/cm^3$, 1.0 $g/cm^3$, 1.1 $g/cm^3$, or 1.2 $g/cm^3$, etc., but is not limited to the above. Preferably, the powder compacted density of the silicon carbon composite anode material is 0.5 $g/cm^3$ to 0.9 $g/cm^3$.

In some embodiments, in the silicon carbon composite anode material, a mass content of carbon element is 15% to 65%, a mass content of the silicon-based active particle is 15% to 70%, and a mass content of the conductive material is 5% to 70%.

Figure 4:
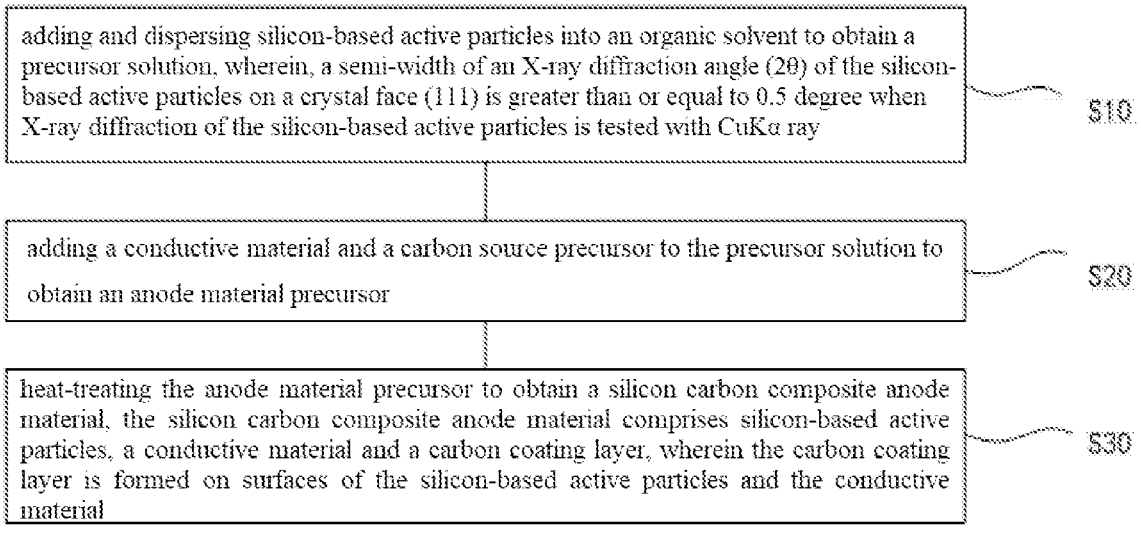
FIG. 4 is a flowchart of the preparation method of the silicon carbon composite anode material provided by an embodiment of the present application.

In the third aspect, the present application also provides a preparation method of a silicon carbon composite anode material. As shown in FIG. 4, the method includes following steps:

S10, adding a silicon-based active particle into an organic solvent and dispersing to obtain a precursor solution, where a semi-width of an X-ray diffraction angle (2θ) of the silicon-based active particle on a crystal face (111) is greater than or equal to 0.5 degree when X-ray diffraction of the silicon-based active particle is tested with CuKα ray;

S20, adding a conductive material and a carbon source precursor to the precursor solution to obtain an anode material precursor; and S30, heat-treating the anode material precursor to obtain a silicon carbon composite anode material, where the silicon carbon composite anode material includes a silicon-based active particle, a conductive material, and a carbon coating layer, and the carbon coating layer is formed on surface of the silicon-based active particle and/or the conductive material.

In the above solution, by controlling the performance parameters of the silicon-based active particle itself, a semi-width of an X-ray diffraction angle (2θ) of the silicon-based active particle on a crystal face (111) is greater than or equal to 0.5 degree. In the preparation process, the silicon-based active particle, the conductive material, and the carbon source precursor are mixed in a solvent, and then heat-treated, so that surfaces of the silicon-based active particle and the conductive material are coated with a carbon coating layer, which can inhibit the occurrence of agglomeration and reduce direct contact between the silicon-based active particle and electrolyte. The anode material prepared facilitate to inhibit volume expansion of silicon, reduce expansion rate of the anode, improve charging and discharging efficiency of the anode, and increase cycle performance of battery.

The semi-width of an X-ray diffraction angle (2θ) of the silicon-based active particle selected on a crystal face (111) is greater than or equal to 0.5 degree. The silicon-based active particle has a small grain size, which can effectively reduce volume expansion rate of silicon and improve cycle performance. When the semi-width of the X-ray diffraction angle (2θ) of the silicon-based active particle on the crystal face (111) is lower than 0.5, the grain size of the silicon active particle is excessively large, and volume expansion rate of the silicon active particle is large, which does not facilitate to improve performances of the anode material.

The solution will be described in detail with following embodiments.

Step S10, adding a silicon-based active particle into an organic solvent and dispersing to obtain a precursor solution.

In some embodiments, the silicon-based active particle includes at least one of Si, $SiO_X$ and silicon alloy, where $0<x\leq2$. The median particle size of the silicon-based active particle is 5 nm to 120 nm. Specifically, it can be 5 nm, 10 nm, 20 nm, 25 nm, 30 nm, 35 nm, nm, 50 nm, 60 nm, 70 nm, 80 nm, 90 nm, 100 nm, 110 nm or 120 nm, etc., but is not limited to the above. Preferably, the median particle size of the silicon-based active particle is 5 nm to 80 nm. It can be found through numerous examinations that nanoscale silicon-based active particle has a high surface energy, and has randomly arranged atoms on its surface, thereby having good extensibility and stability. Moreover, the particle has strong structure, so that the volume expansion of silicon can be inhibited. More preferably, the median particle size of the silicon-based active particle is 5 nm to 40 nm.

In some embodiments, the semi-width of an X-ray diffraction angle (2θ) of the silicon-based active particle on a crystal face (111) can specifically be 0.52, 0.65, 0.71, 0.75, 0.81, 0.86, 0.98, etc., but is not limited to the above. It should be noted that when X-ray irradiates to a small crystal, the diffraction lines thereof will be diffused and thus widened. The smaller the grain size of the crystal, the greater the degree of widening of the X-ray diffraction band. Therefore, when the semi-width of the X-ray diffraction angle (2θ) of the silicon-based active particles on the crystal face (111) is greater than or equal to 0.5, the silicon-based active particle has a small grain size, which can effectively reduce volume expansion rate of silicon, and improve cycle performance Preferably, the semi-width of the X-ray diffraction angle (2θ) of the silicon-based active particle on the crystal face (111) is greater than or equal to 0.6 degree.

In some embodiments, a mass content of $Si^{4+}$ in the silicon-based active particle can be 0.05%, 0.1%, 0.2%, 0.3%, 0.4%, 0.5%, 1%, 1.5%, 2%, 2.5%, 3%, 3.5%, 4%, 4.5%, 5%, etc. It should be noted that due to the presence of $Si^{4+}$ in the silicon-based active particle, it can be a second non-active phase in the process of lithium intercalation and de-intercalation of silicon. When the second non-active phase containing $Si^{4+}$ uniformly disperses in the silicon-based active particle in a diffused fine particle form, it will bring a significant reinforcement. The second non-active phase plays a role of stabilizing structure during volume expansion of silicon, which can effectively inhibit volume expansion of silicon, reduce expansion rate, and improve cycle stability of battery.

In some embodiments, a nanoindentation is applied, a hardness of the silicon-based active particle tested at a pressure of 6 mN is 3 GPa to 20 GPa. Specifically, it can be 3 GPa, 5 GPa, 8 GPa, 12 GPA, 15 GPa, 18 GPa or 20 GPa, etc., but is not limited to the above. When the hardness of the silicon-based active particle is within the above range, due to having strong rigidity, the particle has a strong structure stability, which can resist a certain volume expansion stress, thereby reducing expansion and improving cycle stability of battery.

In some embodiments, the organic solvent includes at least one of methanol, ethanol, ethylene glycol, propanol, isopropanol, propanetriol, n-butanol, isobutanol, and pentanol.

In some embodiments, in the step S10, it also needs to add a surfactant to the organic solvent. The surfactant includes at least one of polyvinyl alcohol (PVA), n-octadecanoic acid, polyethylene glycol (PEG), lauric acid, polyacrylic acid (PAA), sodium dodecylbenzene sulfonate (SDBS), n-eicosanoic acid, polyvinyl chloride (PVC) and polyvinylpyrrolidone (PVP). It is understood that the addition of the surfactant can accelerate dispersion of the silicon-based active particle of avoid agglomeration of the silicon-based active particle.

In some embodiments, in the process of dispersing to obtain the precursor solution, magnetic stirring, mechanical stirring, etc. can be used, or ultrasonic dispersion, grinding dispersion, etc. The grinding dispersion is preferably used, so that the silicon-based active particles can be dispersed to avoid agglomeration of the silicon-based active particle, and can make the silicon-based active particles be dispersed into small single-crystalline silicon nanoparticles. It should be noted that in the process of preparing the silicon-based active particle, the mass content of $Si^{4+}$ can be increased by controlling grinding time of silicon particles. Generally, the longer the grinding time, the higher the mass content of $Si^{4+}$.

Step S20, adding a conductive material and a carbon source precursor to the precursor solution to obtain an anode material precursor.

In some embodiments, a mass ratio of the silicon-based active particle, the conductive material, and the carbon source precursor is (10-70):(5-30):(15-40). Specifically, the mass ratio of the silicon-based active particle, the conductive material, and the carbon source precursor can be 40:10:40, 60:10:30, 50:20:25, 70:5:25, 55:10:30, etc., but is not limited to the above.

In some embodiments, the conductive material includes at least one of graphite flake, carbon nanotube, carbon fiber, and graphene, but is not limited to the listed above, and other conventional conductive material in the art, e.g., coke, carbon black, and carbon micro-sphere, is also applicable. Specifically, the graphite flake can be natural flake graphite, and the carbon fiber can be natural carbon fiber or synthetic carbon fiber.

In some embodiments, the carbon source precursor includes at least one of sucrose, glucose, polyethylene, polyvinyl alcohol, polyethylene glycol, polyaniline, epoxy resin, phenolic resin, furfural resin, acrylic resin, polyethylene oxide, polyvinylidene fluoride, polyacrylonitrile, polyvinyl chloride, and asphalt.

In some embodiments, a median particle size of the carbon source precursor is 1 μm to 50 μm. Specifically, it can be 1 μm, 5 μm, 8 μm, 10 μm, 12 μm, 15 μm, 18 μm, 20 μm, 25 μm, 30 μm, 35 μm, 40 μm, 45 μm or 50 μm, etc., but is not limited to the above. Preferably, the median particle size of the carbon source precursor is 1 μm to 20 μm.

In some embodiments, after adding a conductive material and a carbon source precursor to the precursor solution and stirring evenly, a separation can be performed. Specifically, a manner of the separation can be filtration at atmospheric pressure, reduced pressure filtration, centrifugal filtration, etc. The solid material obtained from separation is dried to obtain the anode material precursor.

In some embodiments, a temperature of the drying is 25° C. to 200° C. Specifically, it can be 25° C., 50° C., 75° C., 100° C., 125° C., 150° C., 175° C. or 200° C., etc., but is not limited to the above.

In some embodiments, a time of the drying is 1 h to 15 h. Specifically, it can be 1 h, 2 h, 3 h, 4 h, 5 h, 7 h, 9 h, 10 h, 12 h, or 15 h, etc., but is not limited to the above.

In some embodiments, a manner of the drying can be drying in furnace, spray drying, vacuum drying, freeze drying, etc. The drying in this embodiment can remove the solvent in the precursor solution as much as possible. The dried anode material precursor is silicon-based active particle and conductive material that are coated by the carbon source precursor. The dried anode material precursor can be sent into a high-temperature box-type furnace for heat treatment, so that the carbon source precursor is carbonized to form a carbon coating layer.

Step S30, heat-treating the anode material precursor to obtain a silicon carbon composite anode material.

In some embodiments, specifically, the heat treatment can be sintering treatment, hot-pressed sintering, and vacuum sintering. A temperature of the heat treatment is 500° C. to 1200° C. Specifically, it can be 500° C., 600° C., 700° C., 800° C., 900° C., 1000° C., 1200° C., 1200° C., etc. Preferably, the temperature of the heat treatment is 800° C. to 1200° C.

In some embodiments, a time of the heat treatment is 1 h to 9 h. Specifically, it can be 1 h, 2 h, 3 h, 4 h, 5 h, 6 h, 7 h, 8 h, 9 h, etc.

In some embodiments, a heating rate of the heat treatment is 1° C./min to 15° C./min. Specifically, it can be 1° C./min, 3° C./min, 5° C./min, 6° C./min, 7° C./min, 8° C./min, 9° C./min, 10° C./min, 12° C./min, or 15° C./min. Preferably, the heating rate of the heat treatment can be 5° C./min to 10° C./min.

In some embodiments, a protection gas is introduced during the heat treatment. The protection gas is at least one of nitrogen, helium, neon, argon or krypton.

In some embodiments, the prepared silicon carbon composite anode material has a core-shell structure, where the core is the silicon-based active particle and the conductive material, and the shell is the carbon coating layer. The particle of the silicon carbon composite anode material can also be spherical or spherical-like in shape. The median particle size of the silicon carbon composite anode material is 5 μm to 30 μm. Specifically, it can be 5 μm, 8 μm, 10 μm, 12 μm, 15 μm, 18 μm, 20 μm, 23 μm, 25 μm, 28 μm, or 30 μm, etc., but is not limited to the above.

Since the nanoscale silicon-based active particle has a high surface energy, they tend to be agglomerated during charging and discharging process. Therefore, in the composite anode material provided by the present application, there is a conductive material among the silicon-based active particles, and surfaces of the silicon-based active particle and the conductive material are coated with a carbon coating layer, which can inhibit the occurrence of agglomeration and reduce direct contact between the silicon-based active particle and electrolyte. The silicon-based active particle has a large specific surface area, thus tend to generate passivation film on the surface during charging and discharging process, which consumes a large amount of lithium ions and reduces concentration of lithium ions in electrolyte, lowering reversible capacity of battery. Therefore, by coating the carbon coating layer, it is able to reduce the direct contact between the silicon-based active particle and electrolyte, reduce the generation of passivation film, and improve the reversible capacity of battery.

In some embodiments, a median particle size of the silicon carbon composite anode material is 8 μm to 20 μm. The carbon coating layer coated on the silicon-based active particle and the conductive material can reduce contact between the silicon-based active particle and electrolyte, reduce generation of passivation film, and improve capacity of battery.

In some embodiments, a specific surface area of the silicon carbon composite anode material is 0.5 m²/g to 10 m²/g. Specifically, it can be 0.5 m²/g, 1 m²/g, 2 m²/g, 3 m²/g, 4 m²/g, 5 m²/g, 6 m²/g, 7 m²/g, 8 m²/g, 9 m²/g, or 10 m²/g, etc., but is not limited to the above. Preferably, the specific surface area of the silicon carbon composite anode material is 1 m²/g to 6 m²/g.

In some embodiments, a powder compacted density of the silicon carbon composite anode material is 0.4 g/cm³ to 1.2 g/cm³. Specifically, it can be 0.4 g/cm³, 0.5 g/cm³, 0.6 g/cm³, 0.7 g/cm³, 0.8 g/cm³, 0.9 g/cm³, 1.0 g/cm³, 1.1 g/cm³, or 1.2 g/cm³, etc., but is not limited to the above. Preferably, the powder compacted density of the silicon carbon composite anode material is 0.5 g/cm³ to 0.9 g/cm³.

In some embodiments, in the silicon carbon composite anode material, a mass content of carbon element is 15% to 65%, a mass content of the silicon-based active particle is 15% to 70%, and a mass content of the conductive material is 5% to 70%.

In this solution, in the silicon carbon composite anode material prepared by the above preparation method, surfaces of the silicon-based active particle and the conductive material are coated with a carbon-coating layer, which can inhibit expansion of the material during cycle process. The semi-width of the X-ray diffraction angle (2θ) of the silicon-based active particle in the core structure on the crystal face (111) is greater than or equal to 0.5 degree, thus the grain is small, which can effectively reduce volume expansion of silicon and improve cycle performance Secondly, in the nanoscale silicon-based active particle, there may be $SiO_x$ oxide on surface of the silicon-based active particle, which can effectively inhibit volume expansion of silicon and improve efficiency and cycle life of the anode including the anode active material. Further, the mass content of Si' in the silicon-based active particle is 0.05% to 5%, which can effectively inhibit volume expansion of silicon, reduce expansion rate, and increase cycle. Finally, the silicon-based active particle has a large hardness and a strong rigidity, which can effectively resist a certain volume expansion stress, facilitating to maintain structure stability of the anode material, thereby reducing expansion rate and improving cycle performance of battery.

Figure 5:
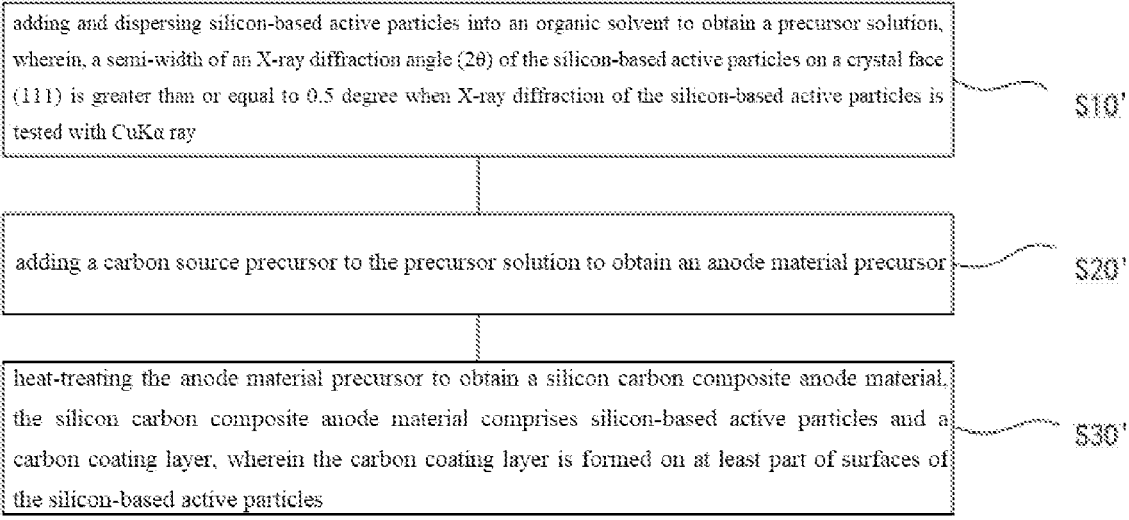
FIG. 5 is another flowchart of the preparation method of the silicon carbon composite anode material provided by an embodiment of the present application.

In the fourth aspect, the present application provides a preparation method of a silicon carbon composite anode material. As shown in FIG. 5, the method includes following steps:

S10', adding a silicon-based active particle into an organic solvent and dispersing to obtain a precursor solution, where a semi-width of an X-ray diffraction angle (2θ)

of the silicon-based active particle on a crystal face (111) is greater than or equal to 0.5 degree when X-ray diffraction of the silicon-based active particle is tested with CuKα ray;

S20', adding a carbon source precursor to the precursor solution to obtain an anode material precursor; and S30', heat-treating the anode material precursor to obtain a silicon carbon composite anode material, where the silicon carbon composite anode material includes a silicon-based active particle and a carbon coating layer, and the carbon coating layer is formed on at least part of surface of the silicon-based active particle.

In the above solution, by controlling the performance parameters of the silicon-based active particle itself, a semi-width of an X-ray diffraction angle (2θ) of the silicon-based active particle on a crystal face (111) is greater than or equal to 0.5 degree. In the preparation process, the silicon-based active particle and the carbon source precursor are mixed in a solvent, and then heat-treated, so that surface of the silicon-based active particle is coated with a carbon coating layer, which can inhibit the occurrence of agglomeration and reduce direct contact between the silicon-based active particle and electrolyte. The anode material prepared facilitate to inhibit volume expansion of silicon, reduce expansion rate of the anode, improve charging and discharging efficiency of the anode, and increase cycle performance of battery.

This embodiment differs from the preparation method described in the third aspect in that, the precursor solution does not need to add a conductive material, while other processes are the same as in the method described in the third aspect, which will not be repeated here. In some embodiments, in the step S20', a mass ratio of the silicon-based active particle and the carbon source precursor is (10-70):(15-40). Specifically, the mass ratio of the silicon-based active particle and the carbon source precursor can be 40:40, 60:30, 50:25, 70:25, 55:30, etc., but is not limited to the above.

In the fifth aspect, the present application also provides a lithium ion battery. The lithium ion battery includes an anode plate, a cathode plate, a separator and non-aqueous electrolyte. The anode plate includes a current collector, and the silicon carbon composite anode material mentioned above or the anode material prepared by the preparation method mentioned above coated on the current collector.

The embodiments of the present application will be further described by following several Examples. The embodiments of the present application are not limited to the specific Examples below, which can be implemented by proper modifications without changing the scope of main claims.

Example 1

(1) silicon powder with a medium particle size of 20 nm was dispersed in ethylene glycol solution by ultrasound dispersion for 10 minutes, and then 1.5 wt % PVP surfactant was added and ultrasonic dispersed for 20 min to obtain a dispersion solution. The dispersion solution was placed in a ball mill for grinding dispersion for 4 h to obtain a precursor solution;

(2) a single-wall carbon nanotube with an aspect ratio of 500 and asphalt were added to the precursor solution in a mass ratio of the silicon powder, the single-wall carbon nanotube and the asphalt of 60:10:30, stirred, dispersed uniformly and then dried to obtain a dry material; and (3) the dry material was placed into a high-temperature box-type furnace, fed with nitrogen, heat-treated at 1000° C., then crushed and sieved through a 500-mesh sieve to prepare a silicon carbon composite material.

In this Example, a semi-width of an X-ray diffraction angle (2θ) of silicon particle in the silicon powder on a crystal face (111) was greater than or equal to 0.98 degree, a mass content of $Si^{4+}$ in the silicon powder was 1.5%, and a hardness of silicon particle in the silicon powder was 18 GPa. The silicon carbon composite anode material obtained had a median particle size of about 6.2 μm, a specific surface area of 10 m²/g, and a mass content of carbon of 20%. The carbon coating layer had a thickness of 300 nm.

Example 2

(1) silicon powder with a medium particle size of 30 nm was dispersed in n-butanol solution by ultrasound dispersion for 10 minutes, and then 2.0 wt % PEG surfactant was added and ultrasonic dispersed for 30 min to obtain a dispersion solution. The dispersion solution was placed in a ball mill for grinding dispersion for 8 h to obtain a precursor solution;

(2) a single-wall carbon nanotube with an aspect ratio of 100 and asphalt were added to the precursor solution in a mass ratio of the silicon powder, the single-wall carbon nanotube and the asphalt of 60:10:30, stirred, dispersed uniformly and then dried to obtain a dry material; and (3) the dry material was placed into a high-temperature box-type furnace, fed with nitrogen, heat-treated at 800° C., then crushed and sieved through a 500-mesh sieve to prepare a silicon carbon composite material.

In this Example, a semi-width of an X-ray diffraction angle (2θ) of silicon particle in the silicon powder on a crystal face (111) was greater than or equal to 0.81 degree, a mass content of $Si^{4+}$ in the silicon powder was 0.5%, and a hardness of silicon particle in the silicon powder was 15 GPa. The silicon carbon composite anode material obtained had a median particle size of about 10 μm, a specific surface area of 9 m²/g, and a mass content of carbon of 30%. The carbon coating layer had a thickness of 100 nm.

Example 3

(1) silicon powder with a medium particle size of 40 nm was dispersed in isopropanol solution by ultrasound dispersion for 10 minutes, and then 3.0 wt % PVA surfactant was added and ultrasonic dispersed for 30 min to obtain a dispersion solution. The dispersion solution was placed in a ball mill for grinding dispersion for 8 h to obtain a precursor solution;

(2) graphene and glucose were added to the precursor solution in a mass ratio of the silicon powder, the graphene and the glucose of 70:5:25, stirred, dispersed uniformly and then dried to obtain a dry material; and (3) the dry material was placed into a high-temperature box-type furnace, fed with nitrogen, heat-treated at 900° C., then crushed and sieved through a 500-mesh sieve to prepare a silicon carbon composite material.

In this Example, a semi-width of an X-ray diffraction angle (2θ) of silicon particle in the silicon powder on a crystal face (111) was greater than or equal to 0.71 degree, a mass content of $Si^{4+}$ in the silicon powder was 1.1%, and a hardness of silicon particle in the silicon powder was 10 GPa. The silicon carbon composite anode material obtained had a median particle size of about 24 μm, a specific surface area of 6 m²/g, and a mass content of carbon of 22%. The carbon coating layer had a thickness of 200 nm.

Example 4

(1) silicon powder with a medium particle size of 80 nm was dispersed in ethylene glycol solution by ultrasound dispersion for 10 minutes, and then 2.5 wt % PEG surfactant was added and ultrasonic dispersed for 30 min to obtain a dispersion solution. The dispersion solution was placed in a ball mill for grinding dispersion for 8 h to obtain a precursor solution;

(2) graphite flake with a medium particle size of 9 nm and sucrose were added to the precursor solution in a mass ratio of the silicon powder, the graphite flake and the sucrose of 50:20:25, stirred, dispersed uniformly and then dried to obtain a dry material; and (3) the dry material was placed into a high-temperature box-type furnace, fed with nitrogen, heat-treated at 900° C., then crushed and sieved through a 500-mesh sieve to prepare a silicon carbon composite material.

In this Example, a semi-width of an X-ray diffraction angle (2θ) of silicon particle in the silicon powder on a crystal face (111) was greater than or equal to 0.62 degree, a mass content of Si⁴⁺ in the silicon powder was 0.2%, and a hardness of silicon particle in the silicon powder was 8 GPa. The silicon carbon composite anode material obtained had a median particle size of about 18 μm, a specific surface area of 6 m²/g, and a mass content of carbon of 18%. The carbon coating layer had a thickness of 800 nm.

Example 5

(1) silicon powder with a medium particle size of 20 nm was dispersed in ethylene glycol solution by ultrasound dispersion for 10 minutes, and then 1.5 wt % PVP surfactant was added and ultrasonic dispersed for 20 min to obtain a dispersion solution. The dispersion solution was placed in a ball mill for grinding dispersion for 4 h to obtain a precursor solution;

(2) a single-wall carbon nanotube with an aspect ratio of 500 and asphalt were added to the precursor solution in a mass ratio of the silicon powder, the single-wall carbon nanotube and the asphalt of 60:10:30, stirred, dispersed uniformly and then dried to obtain a dry material; and (3) the dry material was placed into a high-temperature box-type furnace, fed with nitrogen, heat-treated at 1000° C., then crushed and sieved through a 500-mesh sieve to prepare a silicon carbon composite material.

In this Example, a semi-width of an X-ray diffraction angle (2θ) of silicon particle in the silicon powder on a crystal face (111) was greater than or equal to 0.98 degree, a mass content of Si' in the silicon powder was 0.01%, and a hardness of silicon particle in the silicon powder was 18 GPa. The silicon carbon composite anode material obtained had a median particle size of about 6.6 μm, a specific surface area of 9.8 m²/g, and a mass content of carbon of 21%. The carbon coating layer had a thickness of 300 nm.

Example 6

(1) silicon powder with a medium particle size of 20 nm was dispersed in ethylene glycol solution by ultrasound dispersion for 10 minutes, and then 1.5 wt % PVP surfactant was added and ultrasonic dispersed for 20 min to obtain a dispersion solution. The dispersion solution was placed in a ball mill for grinding dispersion for 4 h to obtain a precursor solution;

(2) a single-wall carbon nanotube with an aspect ratio of 500 and asphalt were added to the precursor solution in a mass ratio of the silicon powder, the single-wall carbon nanotube and the asphalt of 60:10:30, stirred, dispersed uniformly and then dried to obtain a dry material; and (3) the dry material was placed into a high-temperature box-type furnace, fed with nitrogen, heat-treated at 1000° C., then crushed and sieved through a 500-mesh sieve to prepare a silicon carbon composite material.

In this Example, a semi-width of an X-ray diffraction angle (2θ) of silicon particle in the silicon powder on a crystal face (111) was greater than or equal to 0.98 degree, a mass content of Si' in the silicon powder was 1.5%, and a hardness of silicon particle in the silicon powder was 2 GPa. The silicon carbon composite anode material obtained had a median particle size of about 6.6 μm, a specific surface area of 9.8 m²/g, and a mass content of carbon of 21%. The carbon coating layer had a thickness of 300 nm.

Example 7

A nano silicon carbon composite anode material was prepared in the basically same way as Example 1, expect that the grinding dispersion in a ball mill was performed for 8 h.

In this Example, a semi-width of an X-ray diffraction angle (2θ) of silicon particle in the silicon powder on a crystal face (111) was greater than or equal to 0.98 degree, a mass content of Si⁴⁺ in the silicon powder was 8.5%, and a hardness of silicon particle in the silicon powder was 14 GPa. The silicon carbon composite anode material obtained had a median particle size of about 6.6 μm, a specific surface area of 7.9 m²/g, and a mass content of carbon of 21%. The carbon coating layer had a thickness of 300 nm.

Example 8

A nano silicon carbon composite anode material was prepared in the basically same way as Example 1, expect that the grinding dispersion in a ball mill was performed for 8 h.

In this Example, a semi-width of an X-ray diffraction angle (2θ) of silicon particle in the silicon powder on a crystal face (111) was greater than or equal to 0.98 degree, a mass content of Si⁴⁺ in the silicon powder was 3.5%, and a hardness of silicon particle in the silicon powder was 28 GPa. The silicon carbon composite anode material obtained had a median particle size of about 6.5 μm, a specific surface area of 8.8 m²/g, and a mass content of carbon of 20%. The carbon coating layer had a thickness of 300 nm.

Example 9

A nano silicon carbon composite anode material was prepared in the basically same way as Example 1, expect that the grinding dispersion in a ball mill was performed for 2 h.

In this Example, a semi-width of an X-ray diffraction angle (2θ) of silicon particle in the silicon powder on a crystal face (111) was greater than or equal to 0.98 degree, a mass content of Si⁴⁺ in the silicon powder was 0.8%, and a hardness of silicon particle in the silicon powder was 18 GPa. The silicon carbon composite anode material obtained had a median particle size of about 5.8 μm, a specific surface area of 10 m²/g, and a mass content of carbon of 20%. The carbon coating layer had a thickness of 300 nm.

Example 10

(1) silicon powder with a medium particle size of 20 nm was dispersed in ethylene glycol solution by ultrasound dispersion for 10 minutes, and then 1.5 wt % PVP surfactant was added and ultrasonic dispersed for 20 min to obtain a dispersion solution. The dispersion solution was placed in a ball mill for grinding dispersion for 4 h to obtain a precursor solution;

(2) an asphalt was added to the precursor solution in a mass ratio of the silicon powder and the asphalt of 60:30, stirred, dispersed uniformly and then dried to obtain a dry material; and (3) the dry material was placed into a high-temperature box-type furnace, fed with nitrogen, heat-treated at 1000° C., then crushed and sieved through a 500-mesh sieve to prepare a silicon carbon composite material.

In this Example, a semi-width of an X-ray diffraction angle (2θ) of silicon particle in the silicon powder on a crystal face (111) was greater than or equal to 0.80 degree, a mass content of $Si^{4+}$ in the silicon powder was 0.8%, and a hardness of silicon particle in the silicon powder was 18 GPa. The silicon carbon composite anode material obtained had a median particle size of about 6.3 μm, a specific surface area of 12 m²/g, and a mass content of carbon of 25%. The carbon coating layer had a thickness of 350 nm.

Comparative Example 1

A nano silicon carbon composite anode material was prepared in the basically same way as Example 1, expect that silicon powder with a medium particle size of 180 nm was used to prepare a silicon carbon composite material.

In this Comparative Example, a semi-width of an X-ray diffraction angle (2θ) of silicon particle in the silicon powder on a crystal face (111) was greater than or equal to 0.32 degree, a mass content of $Si^{4+}$ in the silicon powder was 0.01%, and a hardness of silicon particle in the silicon powder was 2.5 GPa. The silicon carbon composite anode material obtained had a median particle size of about 15 μm, a specific surface area of 6 m²/g, and a mass content of carbon of 18%. The carbon coating layer had a thickness of 300 nm.

Comparative Example 2

A nano silicon carbon composite anode material was prepared in the basically same way as Example 1, expect that:

In this Comparative Example, a semi-width of an X-ray diffraction angle (2θ) of silicon particle in the silicon powder on a crystal face (111) was greater than or equal to 0.35 degree, a mass content of $Si^{4+}$ in the silicon powder was 4.5%, and a hardness of silicon particle in the silicon powder was 2.5 GPa. The silicon carbon composite anode material obtained had a median particle size of about 22 μm, a specific surface area of 9 m²/g, and a mass content of carbon of 36%. The carbon coating layer had a thickness of 800 nm.

Test Methods

Electrochemical cycling performance was tested as following: dissolving the prepared silicon carbon composite anode material, a conductive agent, and a binders in a mass percent of 94:1:5 in a solvent for mixing, controlling solid content to be 50%, then applying to a copper foil current collector, vacuum drying, to prepare an anode pole piece; and then assembling a 18650 cylindrical single cell by conventional production process by further using a ternary cathode pole piece prepared by a conventional production process, 1 mol/L of electrolyte including $LiPF_6$/(ethylene carbonate) EC+(dimethyl carbonate) DMC+(methyl ethyl carbonate) EMC (v/v=1:1:1), Celgard 2400 separator, and shell. The charge and discharge testing of the cylindrical battery was performed by a LAND cell test system produced by Wuhan Jinnuo Electronics Co., Ltd, under room temperature conditions, charging and discharging at 0.2 C constant current, and the charge and discharge voltage was controlled to 2.75 V to 4.2 V. The test of charging and discharging was performed to obtain the initial reversible capacity, the initial charging capacity and the initial discharge capacity. The initial Coulombic efficiency=the initial discharge capacity/the initial charge capacity.

The cycling was repeated for 50 times. The lithium ion battery was measured the thickness H1 of the pole piece at this time using a micrometer, the expansion ratio after 50 cycles=(H1−H0)/H0×100%.

The cycling was repeated for 100 times. The discharge capacity was recorded as the remaining capacity of lithium ion battery; the capacity retention rate=the remaining capacity/the initial capacity*100%.

A semi-width of an X-ray diffraction angle (2θ) of silicon particle in the silicon powder on a crystal face (111) was tested by an X-ray diffraction method.

Hardness test: the indentation hardness test was tested by a nanoindentation with a load of 0.6 N and a controlled indentation depth of 0.5 um.

$Si^{4+}$ content test: the $Si^{4+}$ content in the silicon powder was tested by an X-ray electronic energy spectrum analyzer.

The results of the above performance test are as follows:

TABLE 1

| | Table of performance comparison results | | | | | | |
|---|---|---|---|---|---|---|---|
| | Semi-width on a crystal face (111) | $Si^{4+}$ content (%) | Hardness of silicon particles (Gpa) | Initial reversible capacity (mAh/g) | Initial Coulombic efficiency (%) | Capacity Retention Ratio after 100 cycles (%) | Expansion Rate of plate after 50 cycles (%) |
| Example1 | 0.98 | 1.5 | 18 | 1422 | 88.1 | 93.5 | 32.3 |
| Example2 | 0.81 | 0.5 | 15 | 1325 | 88.9 | 93.0 | 35.6 |
| Example3 | 0.71 | 1.1 | 10 | 1391 | 88.2 | 93.2 | 35.7 |
| Example4 | 0.62 | 0.2 | 8 | 1451 | 88.0 | 92.9 | 36.1 |
| Example5 | 0.98 | 0.01 | 18 | 1416 | 86.3 | 91.7 | 39.5 |
| Example6 | 0.98 | 1.5 | 2 | 1438 | 88.6 | 89.2 | 37.6 |

TABLE 1-continued

Table of performance comparison results

| | Semi-width on a crystal face (111) | $Si^{4+}$ content (%) | Hardness of silicon particles (Gpa) | Initial reversible capacity (mAh/g) | Initial Coulombic efficiency (%) | Capacity Retention Ratio after 100 cycles (%) | Expansion Rate of plate after 50 cycles (%) |
|---|---|---|---|---|---|---|---|
| Example7 | 0.98 | 8.5 | 14 | 1233 | 82.1 | 96.3 | 31.8 |
| Example8 | 0.98 | 3.5 | 28 | 1422 | 88.5 | 90.3 | 37.4 |
| Example9 | 0.80 | 0.8 | 18 | 1420 | 87.3 | 92.5 | 33.6 |
| Example10 | 0.98 | 1.5 | 18 | 1395 | 85.0 | 92.4 | 33.2 |
| Comparative Example 1 | 0.32 | 0.01 | 2.5 | 1339 | 84.1 | 84.1 | 47 |
| Comparative Example 2 | 0.35 | 4.5 | 2.5 | 1105 | 80.2 | 91.1 | 43 |

As shown in Table 1, Example 5 differs from Example 1 in that the mass content of $Si^{4+}$ in the silicon-based active particle used is 0.01%. During the charging and discharging, the expansion rate, the cycle life and initial Coulombic efficiency of the plate prepared by the anode material of Example 5 are all lower than that of Example 1.

Example 6 differs from Example 1 in that the hardness of the silicon-based active particle used is only 2 GPa, which is smaller than the hardness of the silicon particle in Example 1, thus the structure stability of the silicon particle is poor, and it is difficult to resist the volume expansion stress during charging and discharging, resulting a reduced cycle stability of battery.

Example 7 differs from Example 1 in that the mass content of $Si^{4+}$ in the silicon-based active particle used is 8.5%. The mass content of $Si^{4+}$ is excessively high, so that the capacity and initial Coulombic efficiency of the anode material are reduced.

Example 8 differs from Example 1 in that the hardness of the silicon-based active particle used is 28 GPa. The hardness is excessively large, chemical bond energy between surfaces of the particles is very large, a higher energy barrier for opening bonding is required for lithium intercalation and de-intercalation, resulting difficult for lithium intercalation, which does not facilitate to improve performance of the anode material.

Example 9 differs from Example 1 in that in step (1) the dispersed solution was placed in the ball mill for grinding dispersion for 2 hours. The grinding time is excessively short relative to the grinding time of 6 h of the silicon particle in Example 1. It can be found that, controlling the grinding time of the silicon particle can increase the mass content of $Si^{4+}$. Generally, the longer the grinding time, the higher the mass content of $Si^{4+}$.

Example 10 differs from the Example 1 in that the conductive material was not added in the preparation, so that the initial Coulombic efficiency and the initial reversible capacity of the battery of Example 10 are lowered than that of Example 1.

The silicon-based active particles used in Comparative Examples 1 and 2 have a semi-width on a crystal face (111) smaller than 0.5, and a hardness smaller than 3 GPa. The expansion rate, the cycle life and initial Coulombic efficiency of the anode plates prepared by the silicon-based active particles are lower than that of Examples 1 to 6.

In sum, by controlling the performance parameters of the silicon-based active particle itself, a semi-width of an X-ray diffraction angle ($2\theta$) of the silicon-based active particle on a crystal face (111) is greater than or equal to 0.5 degree, the mass content of $Si^{4+}$ is 0.05% to 5%, and the hardness of the silicon-based active particle is controlled to be 3 GPa to 20 GPa, which facilitate to inhibit volume expansion of silicon, improve efficiency and cycle life of the anode, and can effectively resist a certain volume expansion stress, thereby reducing expansion rate and improving cycle performance of battery.

The above are merely some preferred embodiments disclosed by the present application, but are not intended to limit the present application. Without beyond the concepts of the present application, those skilled in the art can make any possible change and modification, therefore, the protection scope of the present application shall be determined by the claims of the present application.

What is claimed is:

1. A silicon carbon composite anode material, comprising a silicon-based active particle, a conductive material, and a carbon coating layer, wherein the carbon coating layer is present on surface of the silicon-based active particle and/or the conductive material; and wherein a semi-width of an X-ray diffraction angle of the silicon-based active particle on a crystal face is greater than or equal to 0.5 degree when X-ray diffraction of the silicon-based active particle is tested with CuKα ray, and wherein a mass content of $Si^{4+}$ in the silicon-based active particle is 0.05% to 5%.

2. The silicon carbon composite anode material of claim 1, wherein the silicon carbon composite anode material has a core-shell structure, wherein the core comprises the silicon-based active particle and the conductive material embedded among the silicon-based active particles, and the shell comprises the carbon coating layer.

3. The silicon carbon composite anode material of claim 1, wherein the silicon carbon composite anode material satisfies at least one of following conditions a to e:

a. the silicon-based active particle comprises at least one of Si, $SiO_x$ and silicon alloy, wherein $0<x\leq2$;

b. a median particle size of the silicon-based active particles is 5 nm to 120 nm;

c. a hardness of the silicon-based active particle tested by a nanoindentation is 3 GPa to 20 GPa;

d. the conductive material comprises at least one of graphite flake, carbon nanotube, carbon fiber, and graphene; and e. a thickness of the carbon coating layer is 50 nm to 2500 nm.

4. The silicon carbon composite anode material of claim 1, wherein the silicon carbon composite anode material satisfies at least one of following conditions a to f:

a. a median particle size of the silicon carbon composite anode material is 5 μm to 30 μm;

b. a specific surface area of the silicon carbon composite anode material is 0.5 $m^2/g$ to 10 $m^2/g$;

c. a powder compaction density of the silicon carbon composite anode material is 0.4 $g/cm^3$ to 1.2 $g/cm^3$;

d. a mass content of carbon element in the silicon carbon composite anode material is 15% to 65%;

e. a mass content of the silicon-based active particle in the silicon carbon composite anode material is 15% to 70%; and f. a mass content of the conductive material in the silicon carbon composite anode material is 5% to 70%.

5. A silicon carbon composite anode material, wherein the silicon carbon composite anode material has a core-shell structure, and comprises a silicon-based active particle and a carbon coating layer coated on at least part of surface of the silicon-based active particle; and wherein a semi-width of an X-ray diffraction angle of the silicon-based active particle on a crystal face is greater than or equal to 0.5 degree when X-ray diffraction of the silicon-based active particle is tested with CuKα ray, and wherein a mass content of $Si^{4+}$ in the silicon-based active particle is 0.05% to 5%.

6. A lithium ion battery comprising a silicon carbon composite anode material according to claim 5.

7. The silicon carbon composite anode material of claim 5, wherein the silicon carbon composite anode material satisfies at least one of following conditions a to d:

a. the silicon-based active particle comprises at least one of Si, $SiO_x$ and silicon alloy, wherein $0<x\leq2$;

b. a median particle size of the silicon-based active particles is 5 nm to 120 nm;

c. a hardness of the silicon-based active particle tested by a nanoindentation is 3 GPa to 20 GPa; and d. a thickness of the carbon coating layer is 50 nm to 2500 nm.

8. The silicon carbon composite anode material of claim 5, wherein the silicon carbon composite anode material satisfies at least one of following conditions a to e:

a. a median particle size of the silicon carbon composite anode material is 5 μm to 30 μm;

b. a specific surface area of the silicon carbon composite anode material is 0.5 $m^2/g$ to 10 $m^2/g$;

c. a powder compaction density of the silicon carbon composite anode material is 0.4 $g/cm^3$ to 1.2 $g/cm^3$;

d. a mass content of carbon element in the silicon carbon composite anode material is 15% to 65%; and e. a mass content of the silicon-based active particle in the silicon carbon composite anode material is 15% to 70%.

* * * * *